United States Patent [19]

Hoshina et al.

[11] Patent Number: 5,648,602
[45] Date of Patent: Jul. 15, 1997

[54] INTERNAL COMBUSTION ENGINE MISFIRE DETECTION APPARATUS

[75] Inventors: Atsumi Hoshina; Satoru Watanabe, both of Kanagawa-ken, Japan

[73] Assignee: Unisia Jecs Corporation, Kanagawa-ken, Japan

[21] Appl. No.: 501,062

[22] PCT Filed: Dec. 13, 1994

[86] PCT No.: PCT/JP94/02087

§ 371 Date: Aug. 11, 1995

§ 102(e) Date: Aug. 11, 1995

[87] PCT Pub. No.: WO95/16856

PCT Pub. Date: Jun. 22, 1995

[30] Foreign Application Priority Data

Dec. 13, 1993 [JP] Japan .................. 5-312096

[51] Int. Cl.$^6$ .................................. G01M 15/00
[52] U.S. Cl. .................................................. 73/115
[58] Field of Search ...................... 73/115, 117.3, 73/116, 35.12

[56] References Cited

U.S. PATENT DOCUMENTS

| 5,105,657 | 4/1992 | Nakaniwa | 73/117.3 |
|---|---|---|---|
| 5,127,262 | 7/1992 | Demizu et al. | 73/115 |
| 5,263,453 | 11/1993 | Wakahara et al. | 73/117.3 |
| 5,307,671 | 5/1994 | Akase | 73/117.3 |
| 5,442,954 | 8/1995 | Fukui et al. | 73/117.3 |
| 5,469,735 | 11/1995 | Watanabe | 73/117.3 |
| 5,505,077 | 4/1996 | Fukui et al. | 73/117.3 |

FOREIGN PATENT DOCUMENTS

| 3-138433 | 6/1991 | Japan . |
|---|---|---|
| 3-164554 | 7/1991 | Japan . |
| 3-206337 | 9/1991 | Japan . |
| 4-265475 | 9/1992 | Japan . |

*Primary Examiner*—Richard Chilcot
*Assistant Examiner*—Eric S. McCall
*Attorney, Agent, or Firm*—Lowe, Price, LeBlanc & Becker

[57] ABSTRACT

An object of the invention is to improve misfire detection accuracy by learning misfire levels which provide a reference for misfire judgment. Mean effective pressure is computed by integrating cylinder pressure. Judgement is then made to determine whether or not the fuel is being cut off. If not, misfire judgment is carried out by retrieving a misfire level from a map of misfire levels for different engine rotational speeds, and comparing the retrieved misfire level with the indicated mean effective pressure. When the fuel is being cut off, data in the misfire level map is rewritten with the mean effective pressures during fuel cut-off as the misfire levels corresponding to the actual engine rotational speeds.

12 Claims, 4 Drawing Sheets

INTERNAL COMBUSTION ENGINE MISFIRE DETECTION APPARATUS

TECHNICAL FIELD

The present invention relates to a misfire detection apparatus for an internal combustion engine.

BACKGROUND ART

Heretofore known internal combustion engine misfire detection apparatus, detect cylinder pressure with a cylinder pressure sensor and integrate the detected value over a predetermined interval to obtain the indicated mean effective pressure. This is then compared with a predetermined misfire level, and when equal to or below the predetermined misfire level, misfire is judged and a warning generated.

With such misfire detection apparatus however, since the misfire level is fixed, changes with time (due for example to sensor deterioration or a drop in compression ratio due to cylinder leakage and the like) cannot be allowed for, so that the occurrence of erroneous output becomes a problem, particularly in ranges such as at low load where the noise/signal ratio level is high.

In view of the above problem with the conventional technology, it is an object of the present invention to improve detection accuracy by allowing for changes with time.

DISCLOSURE OF THE INVENTION

Accordingly with the present invention, there is provided a misfire detection apparatus for an internal combustion engine comprising: a cylinder pressure detection device for detecting engine cylinder pressures, an indicated mean effective pressure computing device for computing indicated mean effective pressures by integrating the detected cylinder pressures, and a misfire judgment device for judging misfire by comparing the computed indicated mean effective pressures with a misfire level, is constructed as follows so as to appropriately set misfire levels used for judgment in the misfire judgment means.

That is to say there is provided: a rewritable misfire level storage device in which is stored misfire levels of indicated mean effective pressure for different engine operating conditions, an engine operating conditions detection device for detecting engine operating conditions, a fuel cut-off detection device for detecting whether or not fuel to the engine is being cut-off, a misfire level learning device for updating, during fuel cut-off, misfire levels corresponding to an actual engine operating condition, based on the indicated mean effective pressures computed by the indicated mean effective pressure computing device, and rewriting the stored values in the storage device, and a misfire level retrieval device for retrieving a misfire level corresponding to an actual engine operating condition from the storage device and supplying this to the misfire judgment device.

With such a construction, the indicated mean effective pressures are computed by the indicated mean effective pressure computing device when the fuel to the engine is being cut off, to thus make these to be the misfire indicated mean effective pressures, and the misfire levels corresponding to the actual engine operating condition then updated based on these indicated mean effective pressures. The misfire levels which provide the reference for misfire judgment can thus be kept appropriate, enabling an improvement in detection accuracy.

Here the engine rotational speed can be used as an engine operating conditions parameter, and misfire levels of indicated mean effective pressure for different engine rotational speeds stored in the misfire level storage means.

Moreover, a misfire judgment inhibit device may be provided for inhibiting misfire judgment by the misfire judgment device during fuel cut-off. In this case, erroneous judgment during fuel cut-off can be prevented.

A warning device may also be provided for generating a warning based on the judgment results of the misfire judgment device.

Other characteristic constructions, and functions and effects resulting from these, will become more apparent from the following description of the embodiment.

BEST MODE FOR CARRYING OUT THE INVENTION

Figure 1:
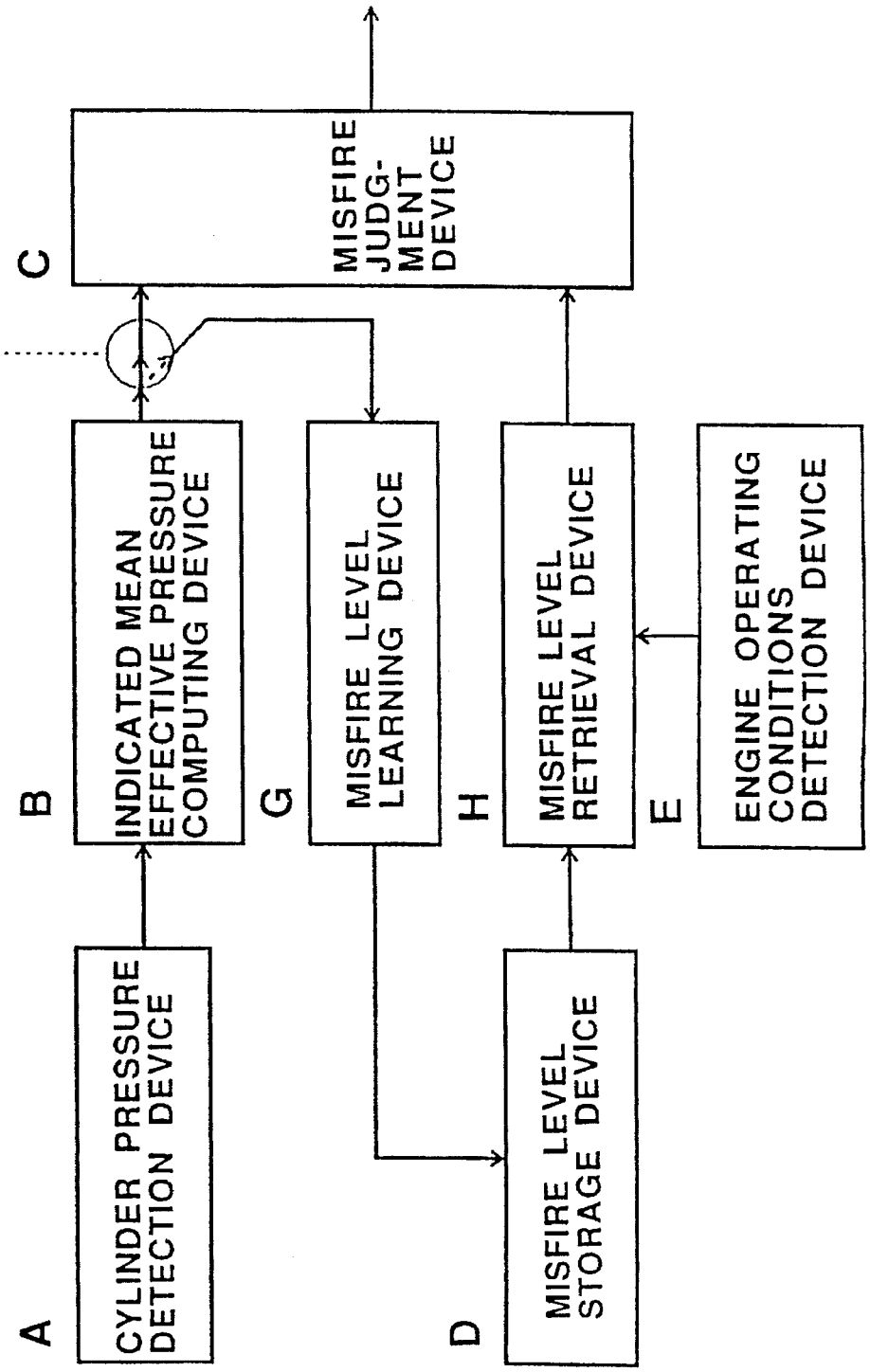
FIG. 1 is a functional block diagram showing a construction of the present invention.

FIG. 1 shows a basic construction of the present invention.

A cylinder pressure detection device A detects engine cylinder pressures. An indicated mean effective pressure computing device B computes indicated mean effective pressures by integrating the cylinder pressures detected by the cylinder pressure detection device A. A misfire judgment device C compares the indicated mean effective pressures computed by the indicated mean effective pressure computing device B with a misfire level, and judges misfire when the indicated mean effective pressure is less than the misfire level.

The misfire level used in the misfire judgment device C is set in the following manner.

A misfire level storage device D stores misfire levels of indicated mean effective pressure for different engine operating conditions (in particular engine rotational speed), so as to be rewritable.

An engine operating conditions detection device E detects engine operating conditions (in particular engine rotational speed).

A fuel cut-off detection device F detects whether or not fuel to the engine is being cut off.

A misfire level learning device G updates during fuel cut-off, misfire levels corresponding to an actual engine operating condition, based on the indicated mean effective pressures computed by the indicated mean effective pressure computing device B, and rewrites the stored values in the storage device D.

A misfire level retrieval device H retrieves a misfire level corresponding to the actual engine operating condition from the misfire storage device D, and supplies this to the misfire judgment device C.

An embodiment of the present invention will now be described with reference to FIG. 2 through FIG. 4.

Figure 2:
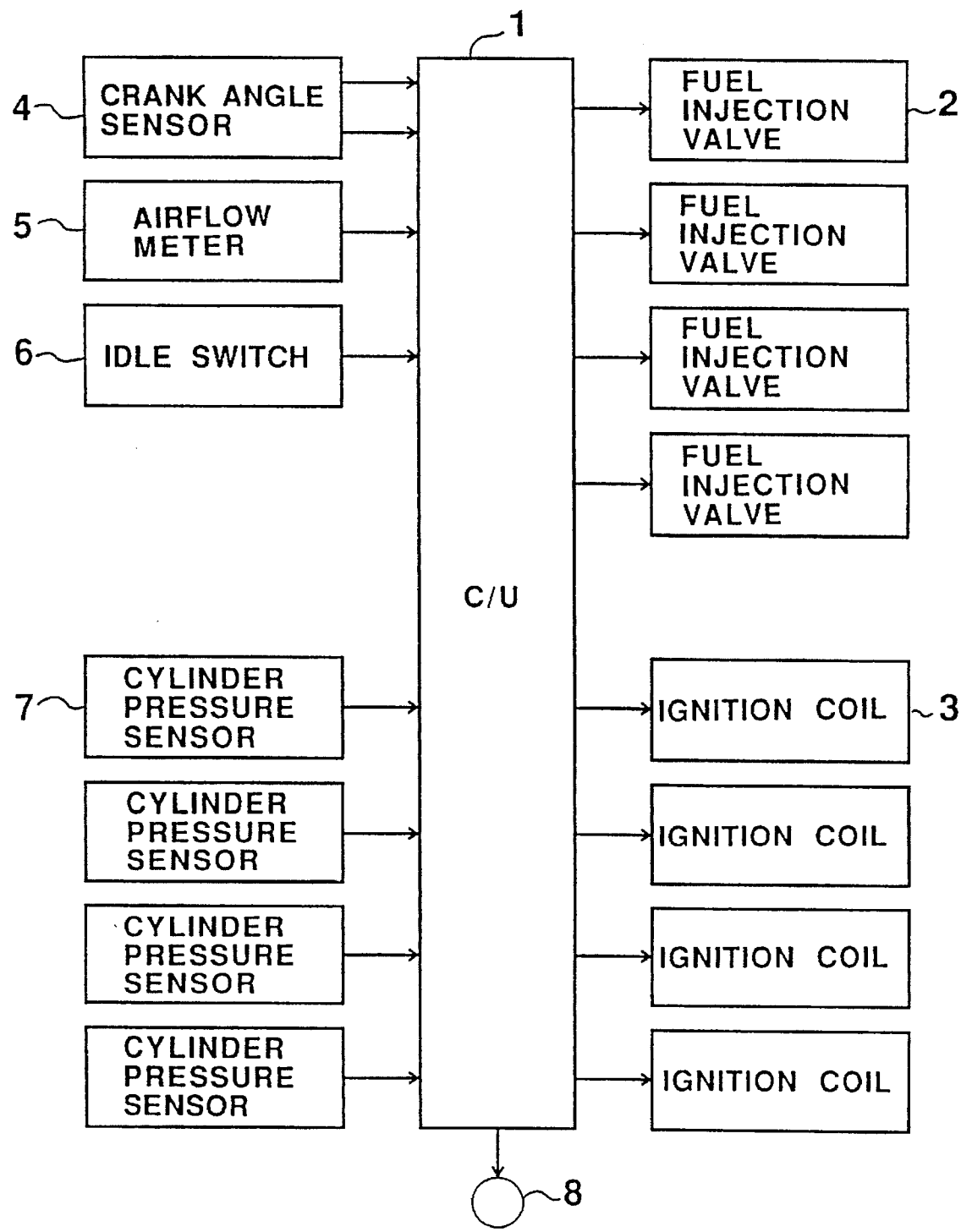
FIG. 2 is a system diagram showing an embodiment of the present invention.

FIG. 2 shows a system construction.

A control unit 1 incorporating a microcomputer, carries out computational processing based on signals from various sensors to control the operation of fuel injection valves 2 and ignition coils 3, provided for each of the cylinders of an engine.

For the various sensors there is provided a crank angle sensor 4, an air flow meter 5, and an idle switch 6. The crank angle sensor 4 outputs a reference signal (including a cylinder discriminating signal) with a period of 720° crank angle, and a unit crank angle signal for each unit crank angle. From these signals the crank angle can be detected, and also engine rotational speed N detected. The air flow meter 5 is for example a hot wire type whereby the intake air quantity Q can be detected. The idle switch 6 comes on when the fully closed position of the throttle valve is detected.

For the cylinder pressure detection device, piezoelectric type cylinder pressure sensors 7 are provided as ignition plug washers for each of the engine cylinders, to detect the cylinder pressure P.

With this arrangement, the control unit 1 computes a basic fuel injection quantity Tp=K×Q/N (where K is a constant) based on the intake air quantity Q and the engine rotational speed N. Various corrections are then carried out on this to determine a final fuel injection quantity Ti=Tp×COEF (where COEF represents various correction coefficients). A drive pulse signal of a pulse width corresponding to this final fuel injection quantity Ti is then output to the fuel injection valves 2 of the respective cylinders at a predetermined timing synchronized with engine rotation, to thus effect fuel injection. During deceleration however, fuel cut-off is triggered by the engine rotational speed N being equal to or above a predetermined fuel cut-off speed when the idle switch 6 comes on, to thus interrupt output of the drive pulse signal to the fuel injection valves 2. This fuel cut-off is released when the engine rotational speed N falls below a recovery rotational speed, or the idle switch 6 goes off.

The control unit 1 also determines ignition timing based on the engine rotational speed N and the basic fuel injection quantity Tp, and controls operation of the ignition coils at this timing to thus effect ignition.

Figure 3:
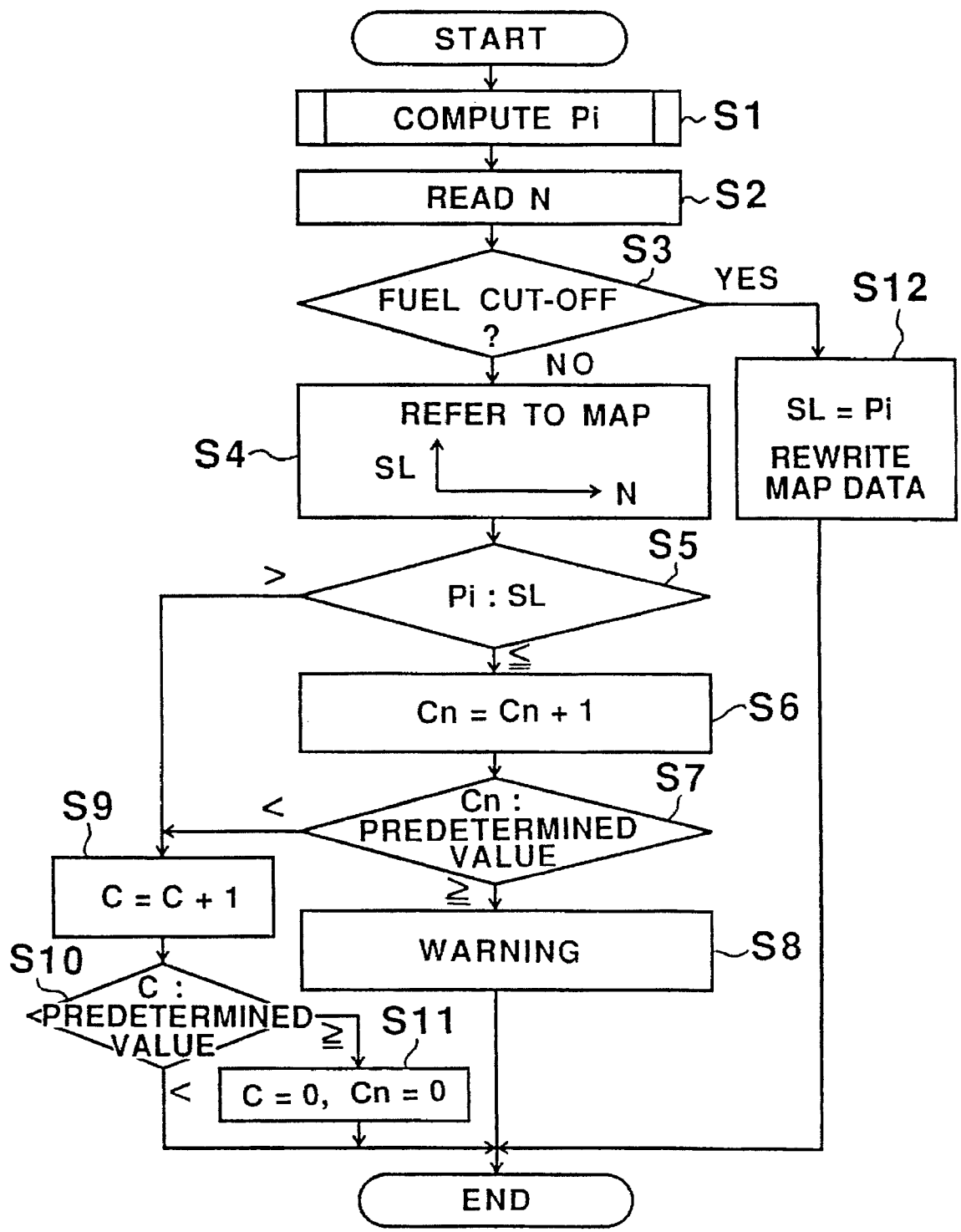
FIG. 3 is a flow chart of a misfire detection routine.

In addition, the control unit 1 detects misfire according to a misfire detection routine shown in FIG. 3, and in predetermined situations generates a warning by means of a warning lamp 8 or the like.

The misfire detection routine of FIG. 3 will now be described.

In step 1 (with step indicated by S in the figures), an indicated mean effective pressure Pi is computed. This part corresponds to the indicated mean effective pressure computing device.

Figure 4:
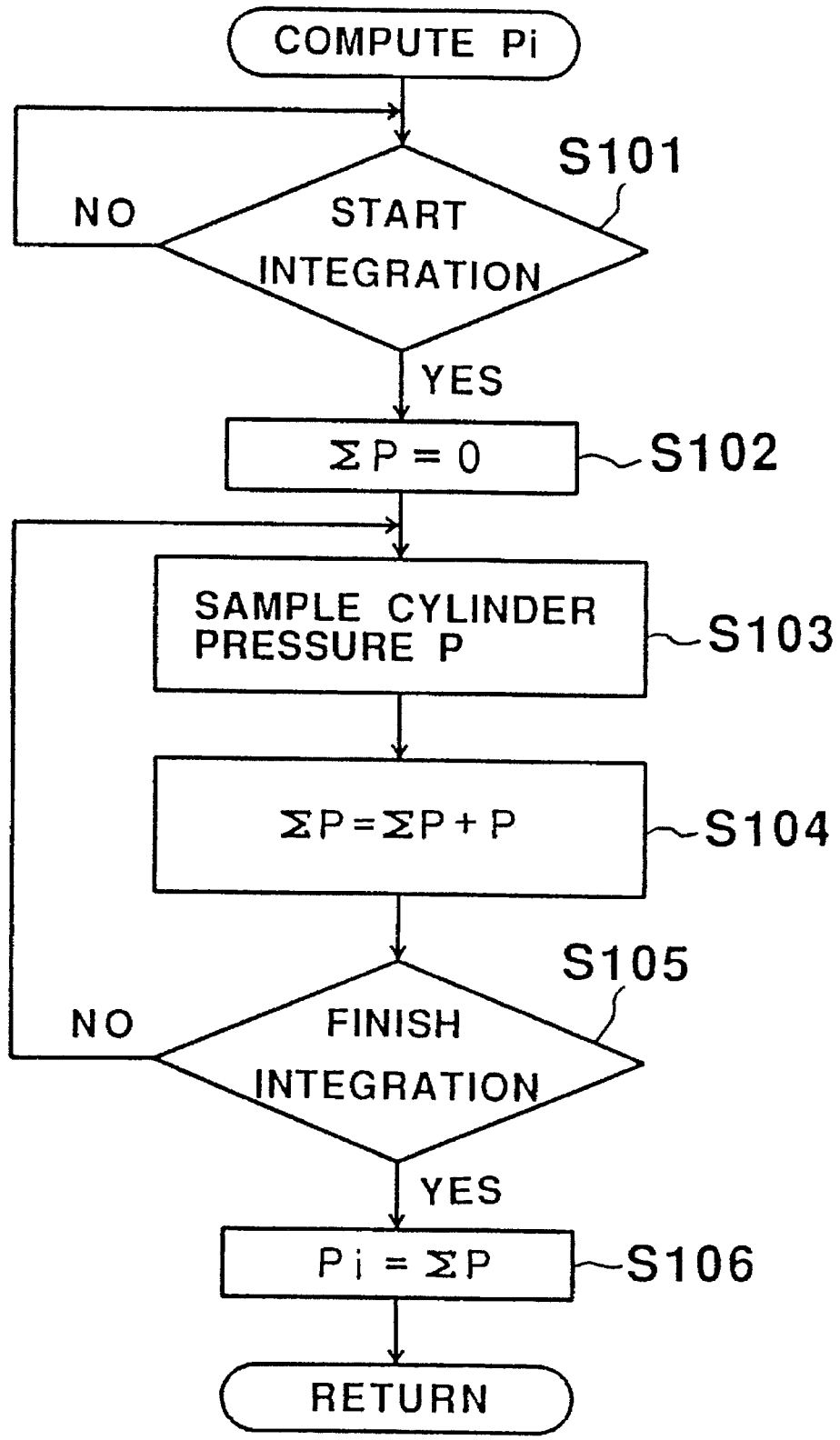
FIG. 4 is a flow chart of an indicated mean effective pressure computation subroutine.

More specifically, this is carried out by the Pi computation subroutine shown in FIG. 4.

That is to say, judgment is made as to whether or not it is a predetermined integration start timing (step 101). If the integration start timing, a cylinder pressure integral value ΣP is cleared (step 102), and the cylinder pressure P then sampled for each unit crank angle (step 103), to add a sampled cylinder pressure P to ΣP (step 104). Judgment is then made as to whether or not it is a predetermined integration finish timing (step 105), and cylinder pressure P sampling and integration is repeated (step 103, 104) until this integration finish timing is reached. Once integration finish timing is reached, the final integrated value ΣP for the cylinder pressure P is made the indicated mean effective pressure Pi (step 106).

In step 2 of FIG. 3, the current engine rotational speed N is read. This part corresponds to the engine operating conditions detection device.

In step 3, judgment is made as to whether or not the fuel is being cut-off. This part corresponds to the fuel cut-off detection device. If the fuel is not being cut-off, control proceeds to step 4, while if the fuel is being cut-off, control proceeds to step 12.

[When the fuel is not being cut-off:]

In step 4, a misfire level SL corresponding to the actual engine rotational speed N is retrieved from a misfire level map in a RAM (rewritable storage device) in which is stored misfire levels SL of indicated mean effective pressures Pi for different engine rotational speeds N (for several different areas). This part corresponds to the misfire level retrieval device.

In step 5, the indicated mean effective pressure Pi and the misfire level SL are compared to thus judge misfire. This part corresponds to the misfire judgment device. More specifically, when Pi>SL this is judged as normal (no misfire), while when Pi≦SL, this is judged as misfire.

When misfire is judged with Pi≦SL, control proceeds to step 6 where a misfire count value Cn for each cylinder is increased by one. Control then proceeds to step 7 where the misfire count value Cn for each cylinder is compared with a predetermined value (for example 2). When the misfire count value Cn is greater than or equal to the predetermined value, this indicates continuous misfire of a particular cylinder and control therefore proceeds to step 8 where a warning is generated. This part corresponds to the warning device.

When judged normal with Pi>SL (no misfire) in step 5, or when the misfire count value Cn is less than the predetermined value in step 7, control proceeds to step 9 where an ignition count value C for the number of ignitions is increased by one. Control then proceeds to step 10 where the ignition count value C is compared with a predetermined value (for example 1000). When the ignition count value C is greater than or equal to the predetermined value, control proceeds to step 11 where the ignition count value C and the misfire count value Cn are cleared.

[When the fuel is being cut-off:]

In step 12, data of the misfire level map in the RAM (rewritable storage device) in which is stored misfire levels SL of indicated mean effective pressures Pi for different engine rotation speeds N (for several different areas), is rewritten with the indicated mean effective pressures Pi during fuel cut-off as the misfire levels SL corresponding to the actual engine rotational speeds N. This part corresponds to the misfire level learning device.

During fuel cut-off, step 12 only is implemented and misfire judgment is cancelled. As a result, erroneous judgment during fuel cut-off is prevented.

Since fuel cut-off is only executed at speeds equal to or above a predetermined recovery rotational speed (for example 1200 rpm), misfire levels cannot be updated at less than this speed. Misfire levels can however be obtained at speeds between idle and lower rotational speeds, by computing indicated mean effective pressures during rotation under engine inertia after switching off the engine key switch, and learning indicated mean effective pressures at this time for the different engine rotational speeds.

With the present embodiment a misfire level map for different engine rotational speeds is used. The misfire levels of indicated mean effective pressures may however be stored for different engine rotational conditions with parameters of both engine rotational speeds and loads. In this case, the load can be in two levels, a high load and low load. Since fuel cut-off corresponds to the low load, then learning will only be possible at low load. However since it is at low load wherein detection accuracy becomes a problem then this is sufficient.

With the present embodiment, the indicated mean effective pressure at the time of fuel cut-off is used unchanged as the misfire level. However this may be updated for use as the misfire level by the addition or subtraction of a predetermined value. Additionally, a misfire level correction coefficient may be set by comparing actual misfire levels with learned misfire levels.

INDUSTRIAL APPLICABILITY

With the present invention as described above, the misfire levels which provide the reference for misfire judgment can be kept appropriate, thus enabling an improvement in detection accuracy irrespective of changes with time. The invention therefore has considerable industrial applicability.

We claim:

1. A misfire detection apparatus for an internal combustion engine incorporating; cylinder pressure detection means for detecting engine cylinder pressures, indicated mean effective pressure computing means for computing indicated mean effective pressures by integrating the detected cylinder pressures, and misfire judgment means for judging misfire by comparing the computed indicated mean effective pressure with a misfire level, wherein there is provided;

rewritable misfire level storage means in which is stored misfire levels of indicated mean effective pressure for different engine operating conditions, engine operating conditions detection means for detecting engine operating conditions, fuel cut-off detection means for detecting whether or not fuel to the engine is being cut-off, misfire level learning means for updating, during fuel cut-off, misfire levels corresponding to an actual engine operating condition, based on the indicated mean effective pressures computed by said indicated mean effective pressure computing means, and rewriting the stored values in said storage means, and misfire level retrieval means for retrieving a misfire level corresponding to an actual engine operating condition from said storage means and supplying this to said misfire judgment means.

2. A misfire detection apparatus for an internal combustion engine according to claim 1, wherein said misfire level storage means stores misfire levels of indicated mean effective pressure for different engine rotational speeds.

3. A misfire detection apparatus for an internal combustion engine according to claim 1, wherein a misfire judgment inhibit means is provided for inhibiting misfire judgment by said misfire judgment means during fuel cut-off.

4. A misfire detection apparatus for an internal combustion engine according to claim 1, wherein warning means is provided for generating a warning based on the judgment results of said misfire judgment means.

5. A misfire detection apparatus for an internal combustion engine incorporating: cylinder pressure detection means for detecting engine cylinder pressures, indicated mean effective pressure computing means for computing indicated mean effective pressures by integrating the detected cylinder pressures, and misfire judgment means for judging misfire by comparing the computed indicated mean effective pressure with a misfire level, wherein there is provided;

rewritable misfire level storage means in which is stored misfire levels of indicated mean effective pressure for different engine operating conditions, engine operating conditions detection means for detecting engine operating conditions, fuel cut-off detection means for detecting whether or not fuel to the engine is being cut-off, misfire level learning means, operating during fuel cut-off detected by said fuel cut-off detection means, for updating misfire levels corresponding to an actual engine operating condition, based on the indicated mean effective pressures computed by said indicated mean effective pressure computing means, and rewriting the stored values in said storage means, and misfire level retrieval means, operating during times other than when fuel cut-off is detected by said fuel cut-off detection means, for retrieving a misfire level corresponding to an actual engine operating condition from said storage means and supplying the retrieved level to said misfire judgement means.

6. A misfire detection apparatus according to claim 5, wherein said misfire level learning means operates for updating misfire levels corresponding to the actual engine operating condition only during fuel cut-off detected by said fuel cut-off detection means.

7. A misfire detection apparatus according to claim 6, wherein said misfire level retrieval means operates for retrieving the misfire level corresponding to the actual engine operating condition from said storage means and for supplying the retrieved level to said misfire judgement means only during times other than when fuel cut-off is detected by said fuel cut-off detection means.

8. A misfire detection apparatus according to claim 5, wherein said misfire level retrieval means operates for retrieving the misfire level corresponding to the actual engine operating condition from said storage means and for supplying the retrieved level to said misfire judgement means only during times other than when fuel cut-off is detected by said fuel cut-off detection means.

9. A misfire detection apparatus for an internal combustion engine incorporating: cylinder pressure detection means for detecting engine cylinder pressures;

indicated mean effective pressure computing means for computing indicated mean effective pressures by integrating the detected cylinder pressures;

fuel cut-off detection means for detecting whether or not fuel to the engine is being cut-off;

misfire judgment means, operating during times other than when fuel cut-off is detected by said fuel cut-off detection means for judging misfire by comparing the computed indicated mean effective pressure with a misfire level;

rewritable misfire level storage means in which is stored misfire levels of indicated mean effective pressure for different engine operating conditions;

engine operating conditions detection means for detecting engine operating conditions;

misfire level learning means, operating during fuel cut-off detected by said fuel cut-off detection means, for updating misfire levels corresponding to an actual engine operating condition, based on the indicated mean effective pressures computed by said indicated mean effective pressure computing means, and rewriting the stored values in said storage means, and misfire level retrieval means for retrieving a misfire level corresponding to an actual engine operating condition from said storage means and supplying the retrieved level to said misfire judgement means.

10. A misfire detection apparatus according to claim 8, wherein said misfire level learning means operates for updating misfire levels corresponding to the actual engine operating condition only during fuel cut-off detected by said fuel cut-off detection means.

11. A misfire detection apparatus according to claim 10, wherein said misfire judgment means operates for judging misfire by comparing the computed indicated mean effective pressure with the misfire level only during times other than when fuel cut-off is detected by said fuel cut-off detection means.

12. A misfire detection apparatus according to claim 9, wherein said misfire judgment means operates for judging misfire by comparing the computed indicated mean effective pressure with the misfire level only during times other than when fuel cut-off is detected by said fuel cut-off detection means.

* * * * *